United States Patent Office 3,312,595
Patented Apr. 4, 1967

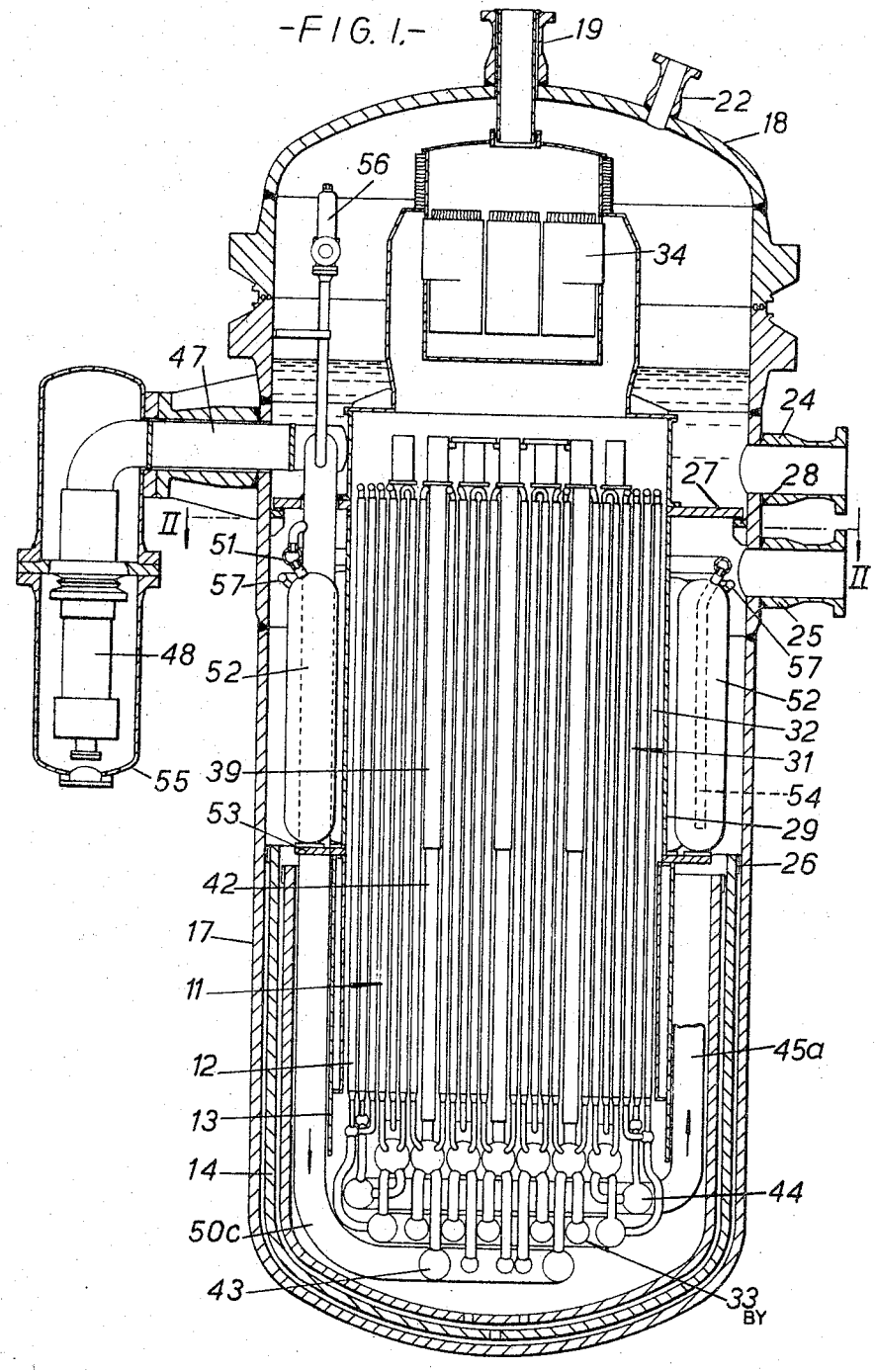

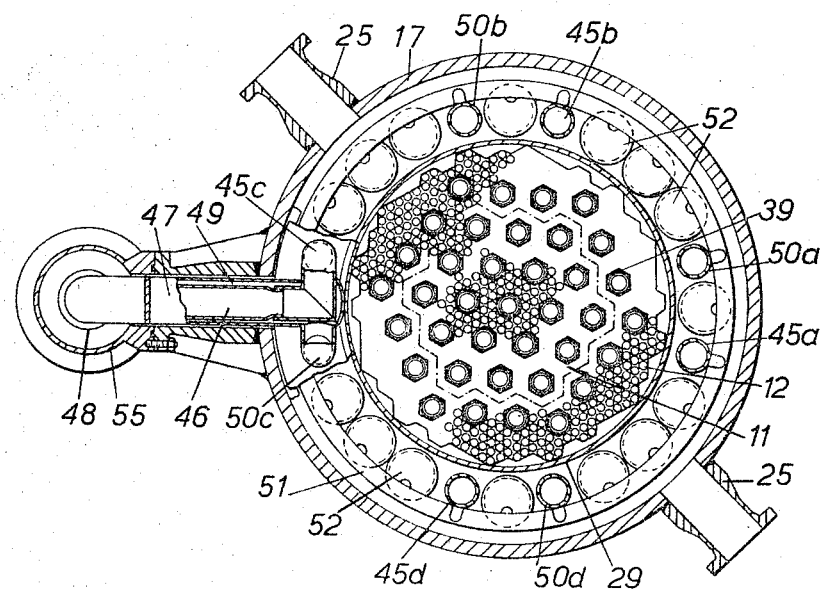

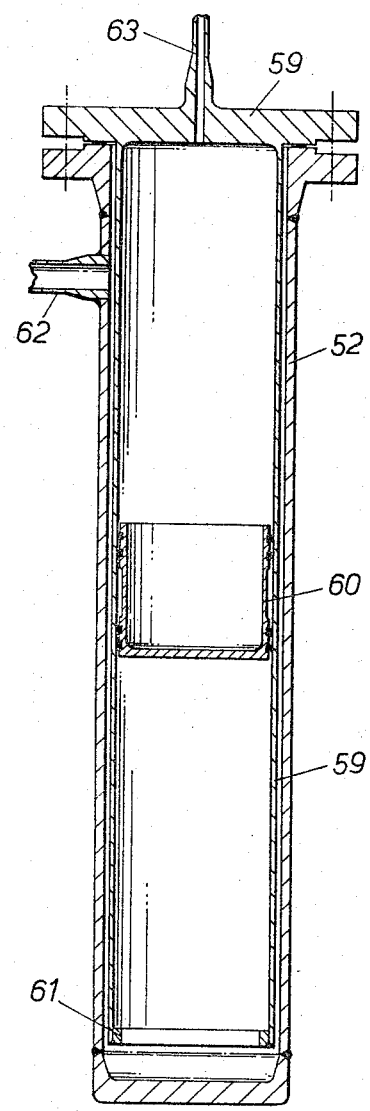

3,312,595
NUCLEAR REACTOR WITH INTERNAL PRESSURIZER
Stanley Hackney, Warrington, England, assignor to United Kingdom Atomic Energy Authority, London, England
Filed Sept. 22, 1964, Ser. No. 398,224
Claims priority, application Great Britain, Oct. 11, 1963, 40,171/63; Oct. 24, 1963, 41,954/63
8 Claims. (Cl. 176—52)

The present invention relates to nuclear reactors of the kind employing a liquid coolant which is pressurised for control of its boiling. To achieve pressurisation of the liquid, it is usual to provide a so-called pressuriser in which gaseous phase medium (to be understood herein to include vapour) is trapped in a chamber and imparts its pressure to a free surface formed by the liquid in the chamber.

According to the present invention, a nuclear reactor employing a pressurised liquid coolant which flows in a circuit at least in part within the boundaries of a vessel containing the reactor core is provided with a coolant pressuriser which comprises a plurality of separate units disposed within the vessel boundaries and each having space for a trapped volume of gaseous phase medium to impart its pressure to a surface presented by the coolant therein. The subdivision of what would be as a single entity a relatively large item for accommodation inside the vessel facilitates considerably the finding of enough interior space without any heavy penalty in the form of increased vessel size. Thus the invention enables the pressuriser to be distributed in various parts of the vessel interior which might otherwise be left vacant.

A convenient location in many cases for the pressuriser units is along the side walls of a cylindrically shaped vessel interspersed with the reactor internals such as pipework, ducting, etc., it being preferred in these circumstances that each unit is elongated and disposed in an upright attitude. Preferably the gas spaces of the units are interconnected in common.

The accommodation of the pressuriser within the vessel implies particular application to the type of nuclear reactor, currently referred to as an "integral" reactor, in which heat exchange takes place between primary and secondary coolants within the core containing vessel, the heated secondary coolant being drawn off for use in external utilisation apparatus. The extent of the primary coolant circuit which is pressurised may be confined within the core containing vessel in the interests of safety. For an integral reactor where fuel elements constituting the reactor core are contained together with the pressurised primary liquid coolant in a system of tubes directly exposed for heat transfer to the secondary coolant, the pressuriser may be arranged to act as a fixed volume apparatus by which is meant that the mass of pressurised primary liquid coolant in the system is intended to remain constant so that the gas spaces of the pressuriser units should collectively be sufficient to accommodate the change of primary coolant volume up to maximum operating temperature.

The pressuriser units are advantageously in the regions of the vessel at uniform constant temperature; for the integral reactor outlined in the previous paragraph such regions are found in the entering secondary coolant.

In accordance with a further feature of the invention, each pressuriser unit comprises a chamber, a freely movable abutment substantially impervious to the coolant and gas and separating two portions of the interior of the chamber, and connections for the admission of coolant and gas respectively to the two portions; the gas is maintained free from contact with the liquid coolant in this way so as to enable the use as the pressurising medium of gases which might otherwise tend to enter the liquid coolant by absorption, entrainment or condensation. The abutment conveniently takes the form of a free piston.

Preferably the travel of the abutment in the direction towards the liquid coolant portion of the chamber interior is limited so that the liquid coolant is relieved of applied pressurisation in the event that it suffers an abnormal diminution of volume. With this feature the pressurising medium is also prevented from expanding into the liquid coolant circuit.

The invention will be further described with reference, by way of example, to the accompanying drawings, in which:

FIGURE 1 is a vertical section of the nuclear reactor embodying the invention,

FIGURE 2 is a plan view for the most part on line II—II of FIGURE 1, and

FIGURE 3 shows diagrammatically a pressuriser unit modified to include a free piston.

The reactor illustrated in FIGS. 1 and 2 is of the integral type and has a core 11 (FIGURE 1) in which fuel elements are housed in a system of fuel tubes 12 through which pressurised light water is circulated as a primary coolant. The fuel tubes are clustered in upright parallel relationship to group the fuel elements into a critical configuration within a region defined by a baffle 13, this assembly being housed in a double-walled pot 14. A secondary coolant, also light water, is circulated downwards through the annular space between the pot and the baffle and upwardly through the core between the fuel tubes. Neutron moderation in the reactor is effected by the primary and secondary coolants.

The reactor is housed in a reactor vessel 17 closed by a dome 18 from which projects a steam pipe 19 and three connections 22 (of which only one is shown in FIGURE 1) for the fitting of secondary coolant pressure relief valves. Projecting laterally of the vessel below the dome are two outlets 24 (only one shown) for recirculating unevaporated secondary coolant, and also two inlets 25 (only one shown) for the recirculating secondary coolant. In fact, the secondary coolant outlets 24 are diametrically opposed, as are also the inlets 25 but on a perpendicular diameter, and they are purposely misplaced in FIGURE 1 to make them visible.

The pot 14 sits within the lower half of the reactor vessel being located by a rim 26 surrounding the pot. Depending from an annular top support plate 27 resting on an internal rim 28 of the vessel is a skirt 29 defining a cylindrical heat transfer region 31 within which are clustered extension tubes 32, each extension tube being a continuation of a fuel tube. The upper ends of the extension tubes are interconnected in pairs by U-bends and the lower ends of the fuel tubes are connected to header pipework indicated generally 33.

Upward flow of the secondary coolant takes place through the core and the heat transfer region into the dome. In its upward passage the secondary coolant is allowed to boil to form a mixture of steam and water which is separated in the dome by cyclone steam separators 34 carried by the top support plate which discharge water to the outlets 24 and steam to the steam outlet.

Hollow open-ended neutron absorber rods 39 are movable by hydraulic operation into the core from positions within the heat transfer region, such movement being over guide tubes 42 and being in steps for any having a control function and continuous for those appropriate for shut down.

Included in the header pipework 33 is an inlet ring header 43 and an outlet ring header 44. It is deemed sufficient for the present description merely to point out that the pairs of tubes 12, 32 (interconnected at the top by the U-bends) are so interconnected in conjunction with the header pipework that the flow of the primary coolant from the inlet to the outlet ring header is in part in series through the tube pairs and in part in parallel.

From the outlet to the inlet ring header, a closed circuit for the primary coolant is completed through four return pipes 45a, b, c and d leading from the outlet ring header 44 to the inner duct 46 of respective coaxial ducting 47, through a respective one of four circulating pumps 48 with its delivery connected to the outer duct 49 of the coaxial ducting 47, and through four feed pipes 50a, b, c and d leading from the outer ducts 49 to the inlet ring header 43. Although only one of the pumps is shown in the drawings, it will be appreciated from the disposition as seen in FIGURE 2 of the paired feed and return pipes 50 and 45 that the pumps are arranged in quadrature, those which are not shown being mounted in exactly the same way.

Each of the feed and return pipes 50 and 45 has a branch connection to a pressuriser ring header 51 encircling an upper part of the skirt 29. Through the intermediary of this header 51 the primary coolant is given communication with a pressuriser which comprises sixteen cylinders 52 disposed parallel in an upright attitude in a ring around the skirt 29. Pedestals 53 for the support of these cylinders are provided at the lower end of the skirt. Communication of the pressuriser ring header with the cylinders 52 is in each case by means of a dip tube 54 which penetrates the top of the cylinder and terminates at an open end adjacent the bottom.

As is evident especially from FIGURE 2, the pressuriser cylinders 52 are interspersed with the feed and return pipes 50 and 45 on approximately the same pitch circle diameter. Being situated in the annular space between the skirt 29 and the vessel 17, they are exposed to the entering secondary coolant. Connected in common to the upper ends of the pressuriser cylinders is a ring header pipe 57 by which gas can be passed thereto from a supply point constituted by a compressor and storage containers situated externally of the reactor vessel, the gas selected for present purposes being nitrogen, helium or hydrogen.

It is notable that the closed primary coolant circuit is entirely within the boundaries of the core containing vessel since chambers 55 housing the pumps 48 and the ducting 47 are constructed as extensions of the vessel in compliance with the same pressure vessel standards. A pressure relief valve for the circuit is indicated at 56.

The pressuriser cylinders are used as a fixed-volume apparatus in this way; in preparing the reactor for operation, and assuming that the primary coolant circuit has already been charged with the proper amount of water, gas at a predetermined pressure made available by the compressor is admitted to the gas spaces of the cylinders to build up therein a pressure related to the prevailing temperature of the primary coolant. When this build up of pressure has been attained, valves by which the gas admission is controlled are closed to trap the gas in the cylinders. The trapped gas pressure is so related to the temperature that when the primary coolant is at a temperature corresponding to the reactor at full power the expansion of the coolant compresses the trapped gas to the operating pressure. The pressure characteristic of the pressuriser cylinders is matched such that any variation of the primary coolant temperature will automatically adjust the coolant pressure to ensure that no bulk boiling of this coolant can occur.

Having regard to the relatively small quantity of water in the primary coolant circuit, the capacity of the pressuriser cylinders is sufficient for the water free surface to be near the bottom of the cylinders when in a hot sub-critical condition (to be explained hereinafter) and approximately half way up the cylinders when at the temperature corresponding to the reactor at full power.

As part of the procedure for preparing the reactor for operation, a hot sub-critical condition will be achieved in which, for example, both coolants are at about 500° F. This is a convenient stage at which to build up the gas pressure in the pressuriser. By way of illustration, let it be supposed that the operating pressure is to be 2,100 lbs. per sq. inch gauge for a full power operating temperature of about 600° F. Gas is admitted to trap a pressure of about 1,300 lbs. per sq. inch gauge in the cylinders at this stage so that the temperature increment to full power will bring about the requisite operating pressure.

Operating the pressuriser as a fixed-volume unit has the added advantage that in the event of the secondary coolant becoming depressurised (its normal pressure being, say, 650 lbs. per sq. inch gauge) the increased boiling of the secondary coolant which then takes place shuts the reactor down and consequently lowers the temperature of the primary coolant and so brings about an automatic reduction of the primary coolant pressure. In this way the fuel and extension tubes are relieved of the full force of the primary circuit operating pressure.

In the modification of FIG. 3, each of the cylinders 52 constituting the pressurizer is closed at the upper end by a cover plate 58 from which is dependent coaxially inside the chamber a cylinder 59 having a suitably machine-finished inner surface for the sliding therein of a free piston 60. The lower end of the cylinder is open to the interior of the chamber and has an inwardly projecting rim 61 to act as a stop to prevent the piston sliding beyond the open end.

The cover plate 58 has a first pipe connection 62 opening into the annular space between the chamber wall and the cylinder for the admission of the primary coolant from the header 51 (FIGURE 1) and a second pipe connection 63 opening into the top of the cylinder for the admission of gas from the ring header pipe 57 (FIGURE 1). Also provided, although not shown, would be means for venting gas displaced by the primary coolant on filling the chamber.

It is to be noted that the cylinder 14 is arranged to be subject to substantially the same pressure both inside and out thereby avoiding tendencies to distort it.

What I claim is:

1. In a nuclear reactor of the kind wherein a reactor vessel contains a reactor core and also internals which constitute both a circuit for a pressurized core-cooling liquid and a means for transferring heat from the pressurized liquid to a secondary coolant, the improvement of a pressurizer comprising a plurality of separate chambers occupying a plurality of spaces left vacant by said internals, and conduits placing said chambers in communication with said circuit, each of the chambers being a trap for a gaseous phase medium.

2. The improvement according to claim 1, wherein the reactor vessel is of an upright cylindrical shape and the chambers are elongated and in upright attitude around the cylindrical wall of the vessel and are interspersed with pipes comprised in said internals.

3. The improvement according to claim 1, wherein a further conduit interconnects the chambers in common, such conduit opening into each chamber adjacent an upper end thereof.

4. The improvement according to claim 3, wherein said further conduit has an extension for the charging of the chambers with gas supplied from outside the reactor vessel.

5. The improvement according to clam 4, wherein each chamber comprises an inlet for the conduit communicating with the pressurized liquid circuit, a gas inlet for the conduit interconnecting the chambers in common, and interposed between the two said inlets within the interior of the chambers a freely movable abutment substantially impervious to the coolant and gas and dividing said interior into two portions, one for the pressurized liquid and one for the gas.

6. The improvement according to claim 5, wherein each chamber is provided with means to limit travel to the movable abutment in the direction from the gas portion towards the other portion.

7. The improvement according to claim 6, wherein each chamber comprises a cylinder open at one end within the chamber, a free piston slidable in the cylinder to act as the movable abutment, and stop means fixed adjacent the open end of the cylinder and adapted to prevent the free piston sliding beyond the open end.

8. An integral nuclear reactor comprising an upright cylindrical reactor vessel containing a reactor core, a circuit in said vessel for a pressurized core-cooling primary liquid, means in said vessel for effecting heat transfer from the primary liquid to a secondary coolant, said circuit comprising a plurality of feed and return pipes extending along and adjacent to the upright interior wall of said vessel, and a primary liquid pressurizer for imparting pressure to said primary liquid, said pressurizer comprising a plurality of separate chambers in said vessel adjacent the interior wall thereof and interspersed between adjacent ones of said plurality of feed and return pipes, means for effecting charging of said chambers with gas from outside said vessel, and means communicating said chambers with said circuit to impart to the primary liquid the pressure of gas in said chambers.

References Cited by the Examiner

UNITED STATES PATENTS

| | | | |
|---|---|---|---|
| 2,605,716 | 8/1952 | Huber | 137—209 |
| 2,990,349 | 6/1961 | Roman | 176—54 |
| 3,131,721 | 5/1964 | Allen | 137—207 |
| 3,175,954 | 3/1965 | Potter | 176—54 |
| 3,201,319 | 8/1965 | Hackney et al. | 176—54 |

L. DEWAYNE RUTLEDGE, *Primary Examiner.*